(12) United States Patent
Schramm et al.

(10) Patent No.: US 6,542,742 B2
(45) Date of Patent: Apr. 1, 2003

(54) CELL SELECTION IN MOBILE RADIO SYSTEMS

(75) Inventors: Peter Schramm, Erlangen (DE); Frank Müller, Sollentuna (SE); Håkan Gunnar Olofsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/282,205

(22) Filed: Mar. 31, 1999

(65) Prior Publication Data

US 2001/0046879 A1 Nov. 29, 2001

(30) Foreign Application Priority Data

Apr. 1, 1998 (SE) ................................................ 9801172

(51) Int. Cl.$^7$ .............................. H04Q 7/20; H04Q 7/00
(52) U.S. Cl. ...................... 455/436; 455/524; 455/525; 370/332
(58) Field of Search ................................ 455/436, 444, 455/450, 455, 449, 485, 525, 524, 552, 553, 448, 434, 426, 422; 370/329, 335, 337, 331, 332, 333

(56) References Cited

U.S. PATENT DOCUMENTS

| | | | |
|---|---|---|---|
| 5,280,630 A | | 1/1994 | Wang |
| 5,327,576 A | * | 7/1994 | Uddenfeldt et al. ......... 370/333 |
| 5,353,332 A | * | 10/1994 | Raith et al. .................. 455/455 |
| 5,371,780 A | | 12/1994 | Amitay |
| 5,408,514 A | | 4/1995 | Sakamoto et al. |
| 5,497,504 A | | 3/1996 | Acampora et al. |
| 5,590,126 A | | 12/1996 | Mishra et al. |
| 5,625,867 A | | 4/1997 | Rouffet et al. |
| 5,655,003 A | * | 8/1997 | Erving et al. ................ 455/418 |
| 5,717,689 A | | 2/1998 | Ayanoglu |
| 5,734,646 A | * | 3/1998 | Chih-Lin et al. ............ 370/335 |
| 5,826,188 A | * | 10/1998 | Tayloe et al. ................ 455/428 |
| 5,924,026 A | * | 7/1999 | Krishnan ..................... 455/414 |
| 5,956,642 A | * | 9/1999 | Larsson et al. .............. 455/449 |
| 5,983,101 A | * | 11/1999 | Billstrom ..................... 455/426 |
| 6,028,851 A | * | 2/2000 | Persson et al. ............. 370/329 |
| 6,041,235 A | * | 3/2000 | Aalto .......................... 455/437 |
| 6,061,549 A | * | 5/2000 | Labonte et al. ............. 455/67.3 |
| 6,069,883 A | * | 5/2000 | Ejzak et al. ................. 370/335 |
| 6,088,590 A | * | 7/2000 | Anderson et al. ........... 455/437 |
| 6,094,581 A | * | 7/2000 | Fried et al. .................. 455/449 |
| 6,134,230 A | * | 10/2000 | Olofsson et al. ............ 370/337 |
| 6,185,435 B1 | * | 2/2001 | Imura ......................... 455/552 |
| 6,205,128 B1 | * | 3/2001 | Le .............................. 370/331 |

FOREIGN PATENT DOCUMENTS

| | | |
|---|---|---|
| EP | 0766489 A2 | 4/1997 |
| EP | 0767548 A2 | 4/1997 |
| WO | WO97/02716 | 1/1997 |
| WO | 97/31495 | 8/1997 |
| WO | 97/31499 | 8/1997 |
| WO | 97/37503 | 10/1997 |
| WO | WO 99/12302 | 3/1999 |

* cited by examiner

Primary Examiner—Charles N. Appiah

(57) ABSTRACT

The present invention relates generally to the problem of cell selection, for e.g. cell handover, in mobile telecommunication systems, and more particularly to the problem of selecting the optimum cell among cells with differing capabilities due to different air interface modes. Known algorithms for cell selection and handover are extended by applying additional criteria that take into account the capabilities, due to different modulation and coding schemes, of the mobile station and the base stations that are possible candidates. The quality of service ("QoS") is predicted for the different cell candidates based on a combination of signal strength or C/I, different cell capabilities, multislot capability, etc. Then the cell is selected for which the predicted QoS is maximum. In another embodiment the invention is extended by taking into account further criteria which are suitable from a system point of view, e.g. to avoid a significant increase of average outage probability or interference level. The present invention increases the use of base stations supporting high data rates. The result is an increase in overall system throughput.

24 Claims, 5 Drawing Sheets

CELL SELECTION IN MOBILE RADIO SYSTEMS

FIELD OF THE INVENTION

The present invention relates generally to the problem of cell selection, for e.g. cell handover, in mobile telecommunication systems, and more particularly to the problem of selecting the optimum cell among cells with differing capabilities due to different air interface modes.

RELATED ART

In FIG. 1 is shown a view of a typical mobile system with many cells and a number of mobile stations ("MS"). Each of these cells has an associated base station ("BS") which is responsible for radio communication over the air interface to mobile stations in that cell. For a given MS at a given time there is usually one serving cell which is the cell with the base station that the MS is receiving service from so that the MS may receive and transmit communication via the serving base station.

It is characteristic of modern cellular systems that it is possible to switch a call from one base station to another while the mobile station is moving from one cell to another within the mobile communication system. This is termed handover or handoff. In mobile communication systems, the handover process uses measurements made by the mobile station, the serving base station, and/or by surrounding base stations, using these measurements in the handover decision-making process. These measurements can be taken of the quality of the connections, or links, between the MS and the base station or surrounding base stations. "Link quality" measurements include e.g. the raw bit error rate ("BER") and the received signal strength of the various links between the MS and its serving base station or between the MS and the surrounding base stations.

For example, in the mobile communication system known as GSM ("Global System for Mobile Communications"), a mobile station monitors the link quality (e.g. raw BER estimate and received signal strength) of the signal (downlink signal) received from the base station of the serving cell, as well as the link quality in terms of reception level, i.e. the received signal strength, of the downlink signal from the base stations in cells adjacent to the serving cell. In addition, the base station of the cell monitors the quality of the signal (uplink signal) received to the base station from every mobile station that is served by that base station.

Handover then occurs when either the measurement of the MS/BS indicates that the link quality in the currently serving cell is low and a better quality can be obtained from an adjacent cell, or an adjacent cell allows communication with lower transmission levels.

The problem of handover in today's systems can be summed up by saying that the strategy is to keep the mobile station connected to the "best" cell. The problem of selecting the "best" cell is simple in today's systems compared with the new systems to be developed over the coming years. These future systems will be based on different radio interface modes (e.g. with different coding and modulation schemes).

An example of developments in these future systems is the gradual introduction of several modulation and coding schemes in existing systems like e.g. GSM. Modulation is essentially the function which imposes the characteristics of the electromagnetic field (e.g. amplitude and frequency) onto a set of rules and the data to be transmitted (which "modulates" the transmission). In the case of today's GSM it is the phase of the electromagnetic field which carries the information. It is usual to distinguish the modulation and demodulation on one hand, and the transmission and reception on the other. The first processes transform digital data to and from a low frequency modulated signal, and the second pair of processes transform this low frequency modulated signal to and from the electromagnetic field.

In current GSM systems the modulation method used is Gaussian Minimum Shift Keying ("GMSK"). GMSK provides a compromise between a fairly high spectrum efficiency and a reasonable demodulation complexity. In IS-136 today, the modulation scheme is $\pi/4$-Shift Differential Quaternary Phase-Shift Keying (DQPSK).

In the evolution of second generation cellular systems like GSM and D-AMPS, proposed changes have been made to the modulation scheme in order to provide higher bit rates within the same spectrum. There are several proposed schemes. One of these is Differentially-encoded Binary Continuous Phase Modulation ("DBCPM"). This is a family of modulation types, one example of which is $\pi/4$-DBCPM, with the advantage of high power amplifier efficiency. Another proposed scheme is Quaternary-Offset-Quadrature Amplitude Modulation ("Q-O-QAM"), also known as Offset-16QAM.

A key difference between these different modulation schemes is that they provide users with different data rates. The goal of the evolution of these systems is to increase user bit rate. The result is that the systems will be using different modulation schemes, often in neighboring cells, in order to provide different users more options for which data rate they will use. In addition, differing data rates will often require differing channel coding schemes. Also, several coding schemes may be used for one modulation. As a result, there will be a variety of coding and modulation schemes providing different data rates.

Current handover algorithms set up that link between base station and mobile station which provides the highest link quality. There do exist, though, numerous variations of this base scheme where additional criteria are used, like vehicle speed, as illustrated in WO-9702716 "Method for Determining Handover in a Multicellular Communications System", or interference in other cells, as illustrated in WO-9528808 "Handover Method and Arrangement". However, none of the existing methods address the problem which will exist in evolved cellular systems, e.g. the problem of selecting the best cell for handover between cells with different air interface modes (e.g. with different modulation and coding schemes).

SUMMARY OF THE INVENTION

The present invention relates generally to the problem of cell selection, for e.g. cell handover, in mobile telecommunication systems, and more particularly to the problems discussed above. The means of solving these problems according to the present invention are summarized in the following.

As has been seen above, there is a current problem because current handover methods don't consider the capabilities of different cells in terms of different air interface modes when deciding which cell to handover to. It should also be pointed out that the general problems of selecting the best cell during handover apply also to other situations where cell selection occur, e.g. during call set-up or when the mobile stations continuously select cells during idle mode.

In current mobile communications systems this cell selection is not a problem because current systems typically use only one modulation scheme and one coding scheme in addition to typically using only one carrier and slot. In comparison, new systems are being proposed and developed, e.g. evolutions of GSM. In these evolved systems there will simultaneously exist different systems and different cells, each with different modulation and/or coding schemes to provide different data rates to different users. Present cell selection methods are not optimally designed to select the "best" cell for handover in these evolved systems.

Accordingly, it is one object of the present invention to provide a method of selecting the best cell from the user's point of view, i.e. in terms of maximizing the Quality of Service ("QoS"). The maximum QoS can be given in terms of e.g. higher data/bit rate or throughput. This new method of selecting the best cell is done by extending the known algorithm for cell selection and handover, and then applying additional criteria that take into account the capabilities of mobile station and the base stations that are possible candidates. Preferably, achievable data rate (for "transparent" services) or throughput (for "non-transparent" services) is predicted for the different cell candidates, based on their received signal strength or C/I estimates, their different capabilities, multislot availability, etc., and the cell is selected for which the predicted data rate or throughput is maximum.

For the prediction of data rate and throughput, the different levels of robustness of the air interface modes against noise and interference should be taken into account. This can be done for non-transparent services inherently by estimation of Quality of Service in terms of throughput. For transparent services, the quality of service as given by bit rate and required bit error rate, is a suitable criterion. A strategy for the latter case is to select the "closest", e.g. measured by the received signal strength on the broadcast channel, cell that provides the required QoS.

By applying the extended cell selection algorithm according to the present invention, data rate or throughput on some connections may be increased at the cost of higher interference. Thus, another embodiment of the present invention is to take into account system measures like e.g. load and estimated interference level. This may be useful in order to enable the operator to allow such far-distance connections with high data rates only if impact on the system is low. This would be true where e.g. the system load is low.

Although the invention has been summarized above, the method according to the present invention is defined according to appended claims 1 and 21. Various embodiments are further defined in dependent claims 2–20 and 22.

Although this invention has been discussed primarily in the context of GSM systems, it is to be understood by anyone skilled in the art that the present invention is equally applicable to other types of systems such as evolved IS-136.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

Figure 1:
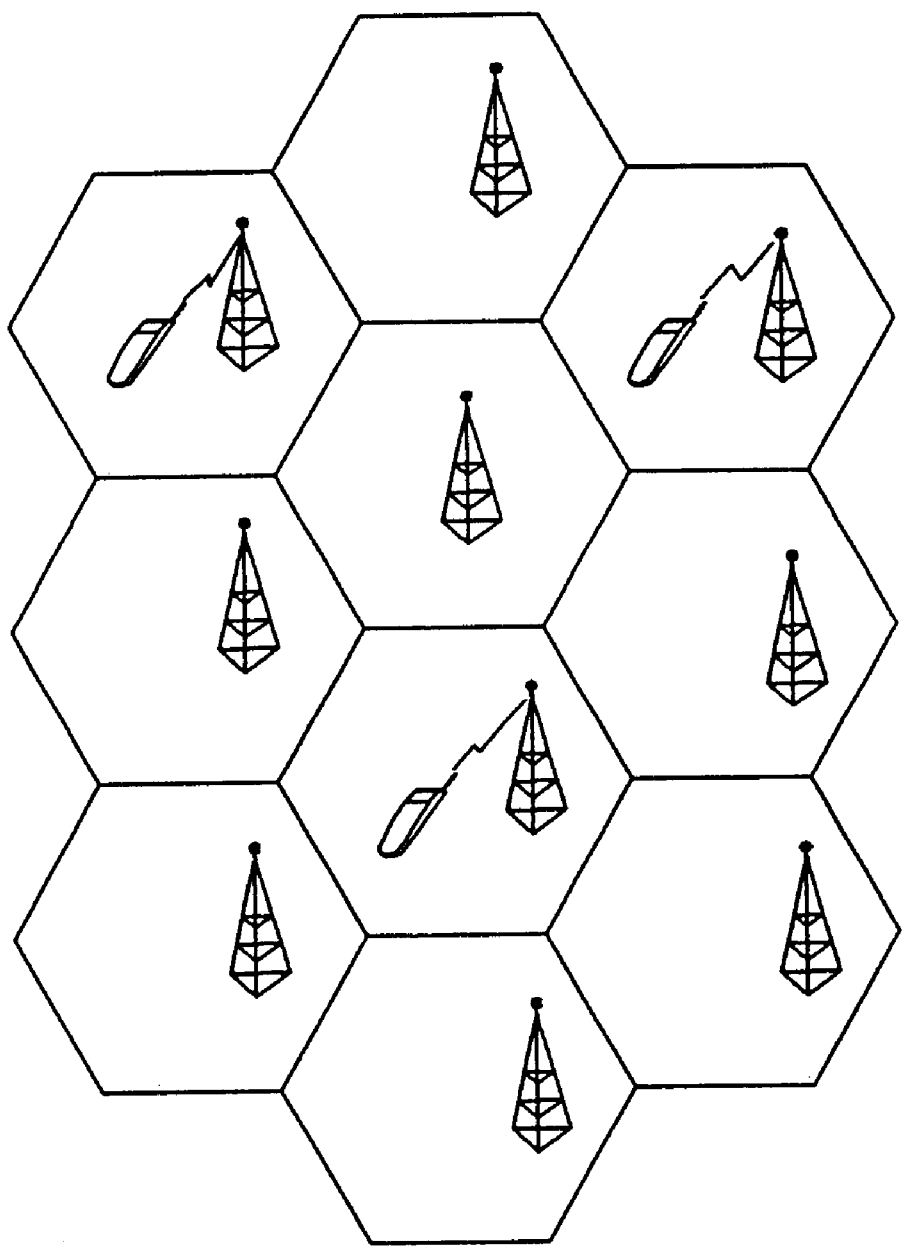
FIG. 1 is a drawing of a cellular mobile communications system.
Figure 2A:
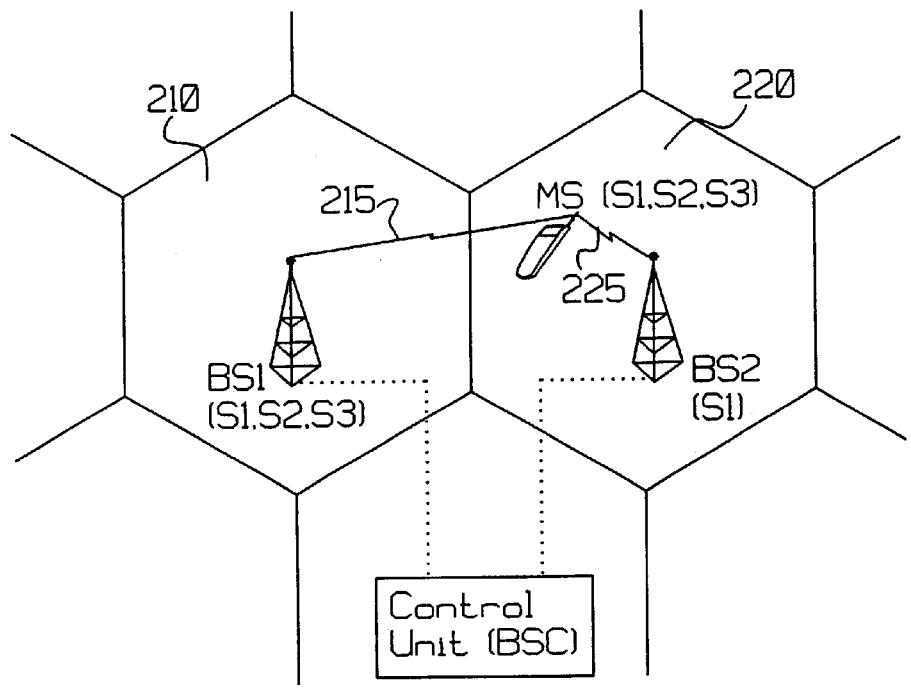
FIG. 2a is a diagram of a mobile station and handover candidates in the system shown in FIG. 1.

In FIG. 2a can be seen a closer view of a few cells e.g. 210, 220, in a mobile system 200 with numerous cells and associated base stations. Also shown is one mobile station ("MS") although, of course, the present invention is not limited to systems with the number of cells shown here or for use with only one MS. The MS here is preparing for a handover to several possible candidates for handover. Although the method illustrated here is specifically shown for a handover procedure, the method of the present invention is one for general "cell selection", equally applicable to e.g. the problem of initial cell selection during call set-up or cell selection performed by the mobile stations during e.g. idle mode.

For illustration purposes there are shown here two suitable candidates, either the first cell 210 or the second cell 220. Responsibility for communications on the air interface 215 in the first cell 210 is taken by the first base station BS1. Responsibility for communications on the air interface 225 in the second cell 220 is taken by the second base station BS2.

It is assumed here that the MS supports several air interface modes (e.g. schemes S1, S2 and S3) that are based on different coding and modulation schemes. These schemes provide different data rates. However, the signal power required to provide a given link quality and given interference level for each of these schemes is different.

As illustrated in FIG. 2a, the first base station BS1 also supports these three air interface schemes S1, S2 and S3. In contrast, the second base station BS2 supports only one scheme S1, providing the lowest data rate. It should be emphasized, however, that the invention is not restricted to base stations having this particular number of schemes. For example, in proposed standards for GSM it is planned that base stations will be capable of supporting up to eight different schemes.

The general method described below will function in all cases, e.g. if (1) the MS supports S1–3 and BS1 supports S1–3 (as shown in FIG. 2a), or (2) the MS supports S1–2, and BS1 supports S13, or (3) the MS supports S1–3, and BS1 supports S1–2, or (4) the current standard handover situation where both MS and BS1 support S1 everywhere. The current method functions the same, independent of how many schemes the MS or the BSs support. In general, all possible links are checked for maximum QoS or throughput, and the link providing it will be selected.

Figure 2B:
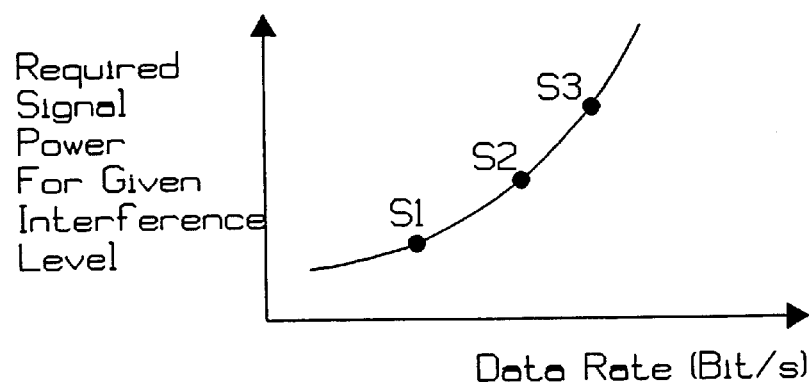
FIG. 2b is a graph showing the relationship between the data rate and signal power for a given interference level.

In FIG. 2b is shown a typical relation between the signal power which is required e.g. to obtain a desired bit error rate for a given interference (and noise) level, and provided data rate on the air interface (including forward error correction). It can be seen that the required signal power typically increases as the data rate increases. As a result, the air interface modes S1, S2 and S3 provide different data rates, but on the other hand are differently susceptible to interference (and noise). Estimates of which handover choice is best should take into consideration this sensitivity when deciding which scheme will provide the best data rate. Looking again at FIG. 2a, if we assume here that the quality of the link 225 from BS2 to MS is higher than that from BS1 to MS then the standard algorithms for cell selection and handover will lead to a traffic connection between the MS and BS2, although throughput may be increased by allowing a traffic connection between the MS and BS1 if a scheme with higher data rates can be used.

However, if we assume that the MS applies the cell selection algorithm according to the present invention we can get a different result. According to the new algorithm the links MS-BS1 215 and MS-BS2 225 are checked not only for a maximum link quality, but the capabilities of both the base stations, BS1 and BS2, as well as the MS are considered as well. In this context as well as previously, link quality may be given by one or several measures like e.g. the received signal level on the broadcast channel, the carrier-to-interference power ratio ("C/I"), the raw BER estimate. Here it may appear that a connection to BS1 will provide a higher data rate or a higher throughput than a connection to BS2. In this case, the cell 210 with BS1 is selected by the present invention's selection algorithm which is usually performed by a control unit on the network side, e.g. the base station controller ("BSC") in a GSM system.

The application of the present algorithm differs according to whether the type of service being provided is a "transparent" service or a "non-transparent" one. A brief explanation of these is in order. It is known that for a given noise and interference level and given channel conditions, the characteristics of transmission when error correction is provided is a compromise between the throughput of data, the transmission delay and the remaining error rate. In modern systems like GSM, no single trade-off fits all the different types of services (e.g. speech vs. data). Out of the possibilities, a short delay despite a relatively high error rate is better in some cases, whereas (e.g. fax) a long delay can be tolerated in order to achieve a better transmission quality.

For these reasons, several types of connection are provided in GSM. For those services to which the transmission is "transparent" (e.g. speech) the system provides a connection with a constant bit rate. For the "non-transparent" services (e.g. fax) there is no continuous connection. The information is sent in packets which may be retransmitted if errors occur, leading to a lower "effective bit rate", which is termed "throughput".

The present invention uses a prediction of data rate and throughput in the handover decision making process. To do this, different levels of robustness of the air interface modes against noise and interference are taken into account. For nontransparent services this is done by estimating the throughput. For transparent services the quality of service ("QoS"), given by e.g. the bit rate and required bit error rate, is the most suitable criterion. QoS can also be defined for non-transparent services, and then is equal to throughput. This general definition of QoS is used particularly in the following general description of the present invention.

Figure 3A:
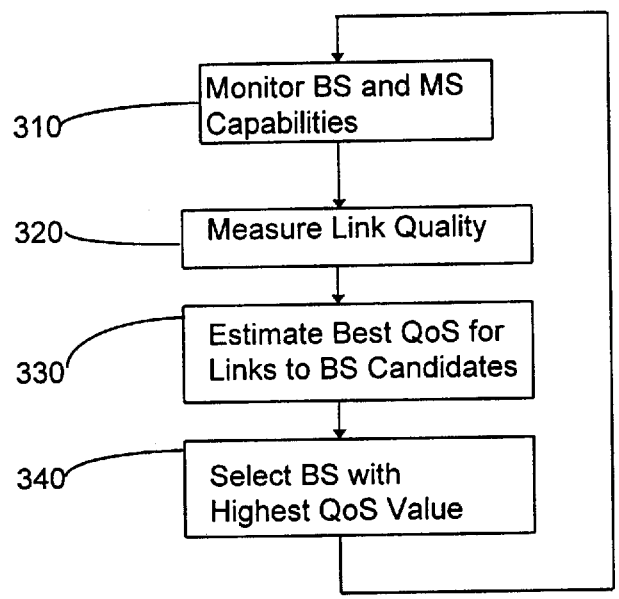
FIGS. 3a and 3b show a flowchart illustrating the steps of the method of the present invention.

In FIG. 3a is shown a flowchart illustrating an embodiment of the algorithm according to the present invention. This embodiment is described independently of the service, and may be used for non-transparent as well as transparent services. The first step 310 in the algorithm is to determine, by monitoring, the capabilities of the BS candidates. These capabilities include e.g. supported coding schemes, supported modulation schemes, multicarrier capability, and multislot capability. This determination is done continuously and will typically be performed in e.g. the base station controller BSC. In addition, the capabilities of the MS must also be checked in the first step 310. This is because the MS may not necessarily support all the schemes available for each BS candidate. Only the capabilities of links on a BS which are supported by the MS need to be considered.

The second step 320 of the algorithm is to measure the link qualities of the BS candidates. The link quality may be given by one or more of a variety of possible measures, including, but not limited to, (1) received signal strength on the broadcast channel BCH, (2) carrier-to-interference ("C/I") estimate for the BCH or traffic channel, and (3) raw BER estimate on a traffic channel.

The third step 330 of the algorithm is to estimate a quality of service ("QoS") value for each possible connection with each candidate base station. This estimation procedure can be performed according to appropriate algorithms which are not the subject of the present invention. The objective is to use the available information for each cell, e.g. received signal strength combined with cell capabilities, to estimate the best QoS for each cell.

The final step 340 of the algorithm is to select the ES among the list of handover candidates to which connection provides the best QoS. Handover will then be performed to that cell providing the best QoS.

Figure 3B:
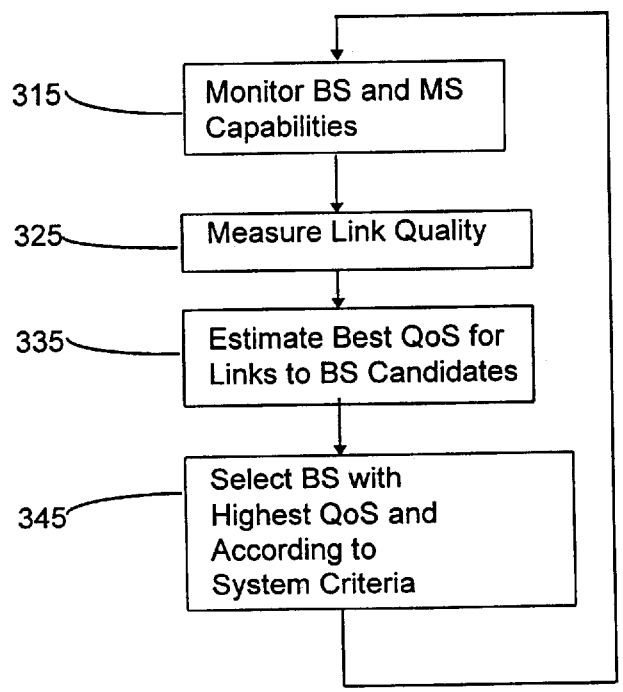

FIG. 3b illustrates an optional extension to this final step. The first three steps 310, 320 and 330 in FIG. 3a have corresponding equivalent steps 315, 325, and 335, in the embodiment shown in FIG. 3b. In FIG. 3b the final estimation procedure 345 of selecting the BS with the best QoS may additionally take into account system criteria like load and interference level, as further described below. In the algorithm as depicted in FIG. 3a no system criterion is explicitly used. Instead, these values may be taken into account inherently by estimation of the best QoS on the various links. However, it should be noted that system parameters such as load may also be used explicitly as in FIG. 3b.

These further criteria used in FIG. 3b are those which are suitable from a system point of view, e.g. to avoid a significant increase of average outage probability or interference level. One such system criterion may be the load on the candidate base stations. This information is available in the control unit, e.g. the BSC, that performs the cell selection algorithm. A simple implementation is to allow the connection, e.g. MS-BS1, only if the load on BS1 is below a pre-defined threshold. This may be defined by the percentage of used traffic channels. By this additional criterion, an impact on the total interference can be avoided.

The network operator may be able to adapt the parameters of this extended cell algorithm individually. For instance, it may be possible to have MSs that have higher priority for high data rate connections than other MSs. This may be implemented by using different thresholds for the allowed load for the selection of cells providing higher data rates.

However, the system criterion "load" may not be sufficient where e.g. the increase of interference is more crucial, and load is only a rough estimate of this value. In this case, the suitable system criterion for cell selection is the estimate of increase of interference by selecting the link MS-BS1 with higher data rates.

In addition, it is apparent that criteria may be combined to take into account several aspects. An example for a combined criterion may be defined by a combination of the data rate provided on the individual links and the load on the individual BS. Calculate $Q=a*(provided-data-rate)-b*(load-on-BS)$, where a and b are positive constants. Here, the base station with maximum value $Q>0$ would be selected.

Figure 4A:
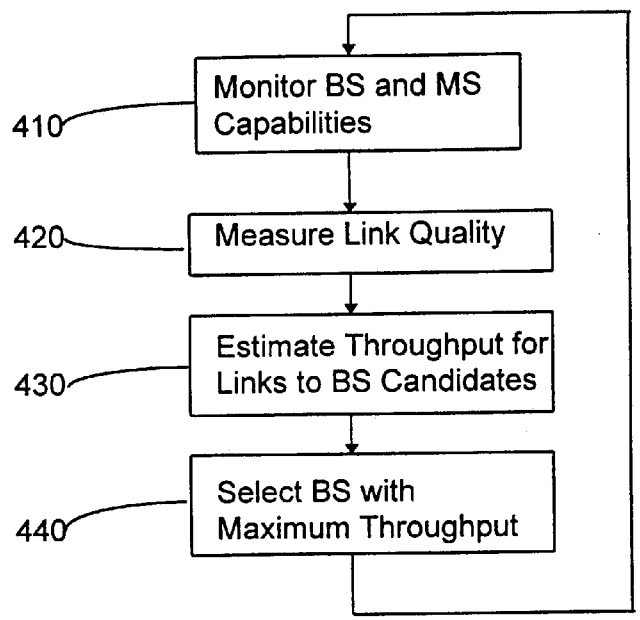
FIGS. 4a and 4b show a flowchart illustrating the steps of the method of the present invention for non-transparent services.

In FIG. 4a is shown a flowchart illustrating an embodiment of the algorithm according to the present invention in the case of non-transparent services. The first step 410 in the algorithm is to determine, by monitoring, the capabilities of the BS candidates. These capabilities include e.g. supported coding schemes, supported modulation schemes, multicarrier capability, and multislot capability. This determination is done continuously and will typically be performed in e.g. the base station controller BSC. In addition, the capabilities of the MS must also be checked. This is because the MS may not necessarily support all the schemes available for each BS candidate. Only the capabilities of links on a BS which are supported by the MS need to be considered.

The second step 420 of the algorithm is to measure the link qualities of the BS candidates. The link quality may be given by one or more of a variety of possible measures, including, but not limited to, (1) received signal strength on the broadcast channel BCH, (2) carrier-to-interference ("C/I") estimate for the BCH or traffic channel, and (3) raw BER estimate on a traffic channel.

The third step 430 of the algorithm is to estimate the throughput for all the BSs. This can be compared to the method in FIGS. 3a and 3b. The best QoS in the general method of FIGS. 3a, 3b, becomes the highest data throughput when providing non-transparent services as in FIGS. 4a, 4b. This estimation procedure of throughput can be performed according to appropriate algorithms which are not part of the present invention. The objective is to use the available information for each cell, e.g. received signal strength combined with cell capabilities, to estimate the maximum throughput for each cell.

Figure 4B:
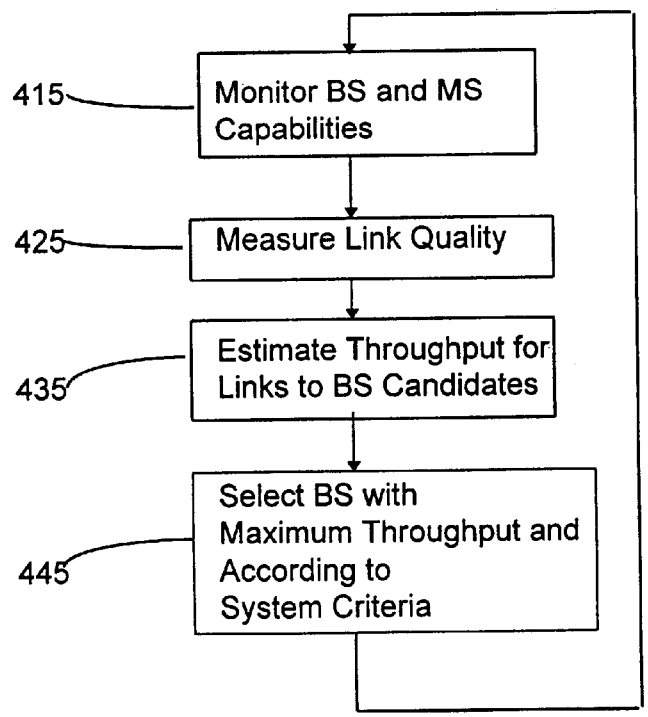

The final step 440 of the algorithm is to select the BS among the list of handover candidates to which connection provides maximum throughput. Handover will then be performed to that cell providing the maximum throughput. FIG. 4b illustrates an optional extension to this final step. The first three steps 410, 420 and 430 in FIG. 4a have corresponding equivalent steps 415, 425, and 435, in the embodiment shown in FIG. 4b. In FIG. 4b the final selection procedure 445 of selecting the BS with the best QoS may additionally take into account system criteria like load and interference level, as further described above in connection with FIG. 3b. In the algorithm as depicted in FIG. 4a no system criterion is explicitly used. Instead, these values may be taken into account inherently by estimation of achievable throughput on the various links. However, it should be noted that system parameters such as load may also be used explicitly as in FIG. 4b.

Figure 5A:
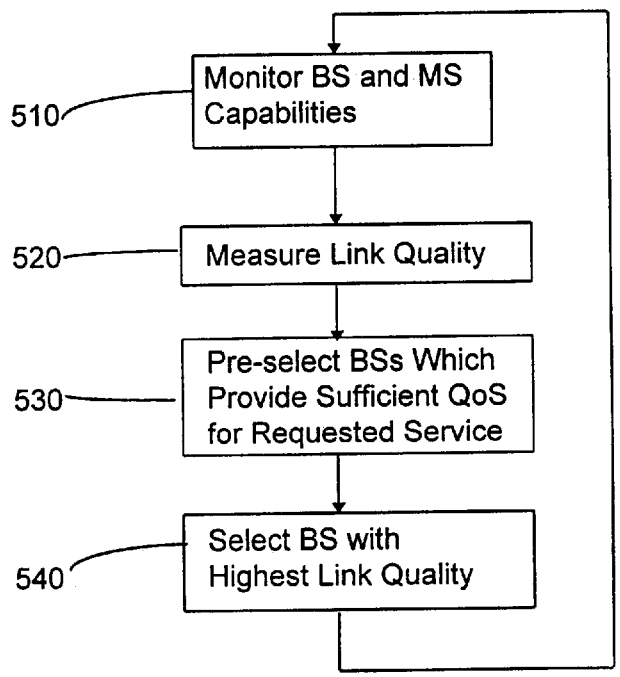
FIGS. 5a and 5b show a flowchart illustrating the steps of the method of the present invention for transparent services.

In FIG. 5a is shown a flowchart illustrating an embodiment of the algorithm according to the present invention in the case of transparent services. The first step 510 in the algorithm is to determine, by monitoring, the capabilities of the BS candidates. These capabilities include e.g. supported coding schemes, supported modulation schemes, multicarrier capability, and multislot capability. This determination is done continuously and will typically be performed in e.g. the base station controller BSC. In addition, the capabilities of the MS must also be checked. This is because the MS may not necessarily support all the schemes available for each BS candidate. Only the capabilities of links on a BS which are supported by the MS need to be considered.

The second step 520 of the algorithm is to measure the link qualities of the BS candidates, as discussed previously. The link quality may be given by one or more of a variety of possible measures, including, but not limited to, (1) received signal strength on the broadcast channel BCH, (2) carrier-to-interference ("C/I") estimate for the BCH or traffic channel, and (3) raw BER estimate on a traffic channel. The carrier-to-interfernce ratio, C/I, provides a better estimate of link quality.

The third step 530 of the algorithm in FIG. 5a shows a difference in the application of the invention to transparent services as contrasted with the general method of FIGS. 3a, 3b, and with non-transparent services in FIGS. 4a, 4b. The third step of the algorithm is to estimate the quality of service ("QoS"), in e.g. terms of bit rate and required bit error rate, for all the BS candidates. Those BSs are then preselected which provide sufficient QoS for the requested service.

Figure 5B:
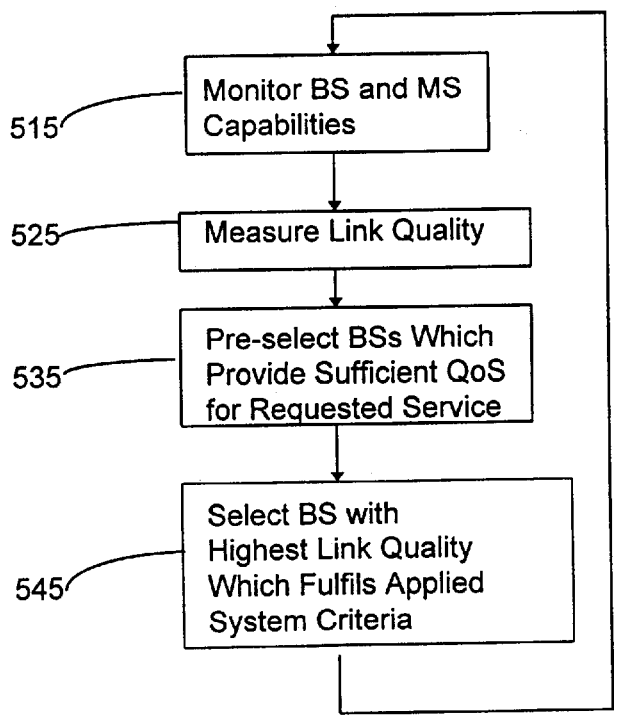

In the case of transparent services using a fixed source rate, a high QoS is equivalent to a low BER with a sufficient data rate, as shown in FIGS. 5a, 5b. Other embodiments in the case of transparent services using an adaptive source rate would evaluate a high QoS as equivalent to a sufficient BER with a high data rate. In embodiments for speech services a high QoS would be evaluated as equivalent to high speech quality. This would be used in the situation where several speech Codecs were in use, which is the case with adaptive multirate ("AMR") in GSM.

The final step 540 of the algorithm is to select the one BS among the list of candidate BSs with maximum link quality, e.g. measured by the received BCH signal strength out of those BSs which provide sufficient QoS as shown in FIG. 5a. Handover will then be performed to that cell providing the sufficient QoS. FIG. 5b illustrates an optional extension to this final step.

The first three steps 510, 520 and 530 in FIG. 4a have corresponding equivalent steps 515, 525, and 535, in the embodiment shown in FIG. 5b. In FIG. 5b the final selection procedure 545 of selecting the BS with sufficient QoS may additionally take into account system criteria like load and interference level, as further described above in connection with FIG. 3b. In effect the final step 545 of the algorithm in FIG. 5b consists of simultaneously checking which BS fulfils two prerequisites: maximum link quality and applied system criteria.

The embodiments described above serve merely as illustration and not as limitation. It will be apparent to one of ordinary skill in the art that departures may be made from the embodiments described above without departing from the spirit and scope of the invention. The invention should not be regarded as being limited to the examples described, but should be regarded instead as being equal in scope to the following claims.

What is claimed is:

1. A method for cell selection in a cellular mobile communications system having a plurality of cells with different air interface schemes, each of said cells comprising at least one Base Station, wherein a Mobile Station communicates with said mobile communications system through an air interface link to one of said at least one Base Station, the method comprising the steps of:

determining communications capabilities of said Base Stations and of said Mobile Station based on a corresponding air interface scheme;

determining possible links between said Mobile Station and said Base Stations based on the communication capabilities;

estimating the quality of each of said possible links between said Mobile Station and said Base Stations;

estimating a Quality of Service value for each of said possible links between said Mobile Station and said Base Stations based on at least the measured link quality and the communication capabilities; and selecting the cell with the Base Station having the highest estimated Quality of Service.

2. The method of claim 1 wherein, each air interface scheme based on a different coding and modulation scheme.

3. The method of claim 1 wherein, said communications capabilities of said plurality of Base Stations and of said Mobile Station are measured in terms of the capabilities of said air interface schemes.

4. The method of claim 1 wherein, said capabilities of said plurality of Base Stations and of said Mobile Station are measured in terms of the multislot availability on the links to said plurality of Base Stations.

5. The method of claim 1 wherein, said capabilities of said plurality of Base Stations and of said Mobile Station are measured in terms of the multicarrier availability on the links to said plurality of Base Stations.

6. The method of claim 1 wherein, said highest Quality of Service is equivalent to the highest data throughput on said link.

7. The method of claim 1 wherein, said highest Quality of Service is equivalent to a combination of the lowest Bit Error Rate and a sufficient data rate.

8. The method of claim 1 wherein, said highest Quality of Service is equivalent to a combination of the sufficient Bit Error Rate and the highest data rate.

9. The method of claim 1 wherein, said highest Quality of Service is equivalent to the highest speech quality.

10. The method of claim 1 further comprising the step of: testing for a given system criterion.

11. The method of claim 10 wherein, said system criterion is the test if load is below a given threshold.

12. The method of claim 10 wherein, said system criterion is a test to determine if the increase in interference level is below a given threshold.

13. The method of claim 10 wherein, said system criterion is the test if system criterion indicator based on a combination of load, interference level, and desired data rate is below a given threshold.

14. The method of claim 1 wherein, said Mobile Station is currently accessing said mobile system from a first Base Station and said cell selection is performed for implementing a handover for said Mobile Station to a second Base Station.

15. The method of claim 1 wherein, said Mobile Station is preparing to access said mobile system and said cell selection is performed for selecting the best cell through which to access said system.

16. The method of claim 1 wherein, said cell selection is performed while said Mobile Station is in idle mode.

17. The method of claim 1 wherein, said Mobile Station and said plurality of Base Stations all support an equal number of air interface schemes.

18. The method of claim 1 wherein, said Mobile Station and at least one of said plurality of Base Stations supports an equal number of air interface schemes, and at least one of the plurality of Base Station supports fewer air interface schemes than said Mobile Station.

19. The method of claim 1 wherein, said Mobile Station and at least one of said plurality of Base Stations supports an equal number of air interface schemes, and at least one of the plurality of Base Station supports more air interface schemes than said Mobile Station.

20. The method of claim 1 wherein, said Mobile Station, at least one of said plurality of Base Stations and a second of said plurality of Base Stations each support a different number of air interface schemes.

21. A system for cell selection in a cellular mobile communications system having a plurality of cells with different air interface schemes, each of said cells comprises at least one Base Station, wherein a Mobile Station for communicating with said mobile system though an air interface link to one of said at least one Base Stations, comprising:

means for determining communication capabilities of said Base Stations and of said Mobile Station based on a corresponding air interface scheme;

means for determining possible links between said Mobile Station and said Base Stations based on the communication capabilities;

means for estimating the quality of each of said possible links between said Mobile Station and said Base Stations;

means for estimating a Quality of Service value for each of possible links between said Mobile Station and said Base Stations based on at least the measured link quality and the communication capabilities; and means for selecting the cell with the Base Station having the highest estimated Quality of Service.

22. The system for cell selection of claim 21 further comprising:

means for testing for a given system criterion.

23. A radiocommunication system comprising:

a mobile station;

a first base station;

a second base station; and a control unit connected to said first and second base stations, wherein communication capabilities of said first and second base stations and of said mobile station are determined based on a corresponding air interface scheme, wherein possible links between the mobile station and the first and second base stations are determined based on the communication capabilities, wherein the quality of each of the possible links between the mobile station and the first and second base stations are estimated, wherein a Quality of Service value for each of the possible links between the mobile station and the first and second base stations is estimated based on at least the measured link quality and the communication capabilities, and wherein a cell in the radiocommunication system associated with either the first or the second base stations is selected based upon the estimated Quality of Service.

24. The radiocommunication system of claim 23, wherein the control unit is a base station controller.

* * * * *